United States Patent [19]
Kurtz

[11] 3,883,215
[45] May 13, 1975

[54] HOLOGRAPHIC SYSTEM FOR NON-DESTRUCTIVE TESTING

[75] Inventor: Robert L. Kurtz, Huntsville, Ala.

[73] Assignee: The United States of America as represented by the National Aeronautics and Space Administration Office of General Counsel-Code GP, Washington, D.C.

[22] Filed: Aug. 8, 1973

[21] Appl. No.: 386,793

[52] U.S. Cl. ............................................. 350/3.5
[51] Int. Cl. .................................... G02b 27/00
[58] Field of Search ................................. 350/3.5

[56] References Cited
UNITED STATES PATENTS

| | | | |
|---|---|---|---|
| 3,507,564 | 4/1970 | Franks | 350/320 |
| 3,532,431 | 10/1970 | Bryngdahl | 356/106 R |
| 3,594,060 | 7/1971 | Lowe | 350/3.5 |
| 3,728,006 | 4/1973 | Brooks et al. | 350/3.5 |

*Primary Examiner*—John K. Corbin
*Attorney, Agent, or Firm*—L. D. Wofford, Jr.; G. J. Porter; J. R. Manning

[57] ABSTRACT

A holographic system for non-destructive testing in which a mirror providing illumination of a surface of a test object is positionable to direct illumination on the object at varying angles with respect to a line normal to the surface of the object, whereby holograms may be produced with varying degrees of sensitivity enabling optimum observation of dimensions of deformation of an object occurring between test exposures.

4 Claims, 2 Drawing Figures

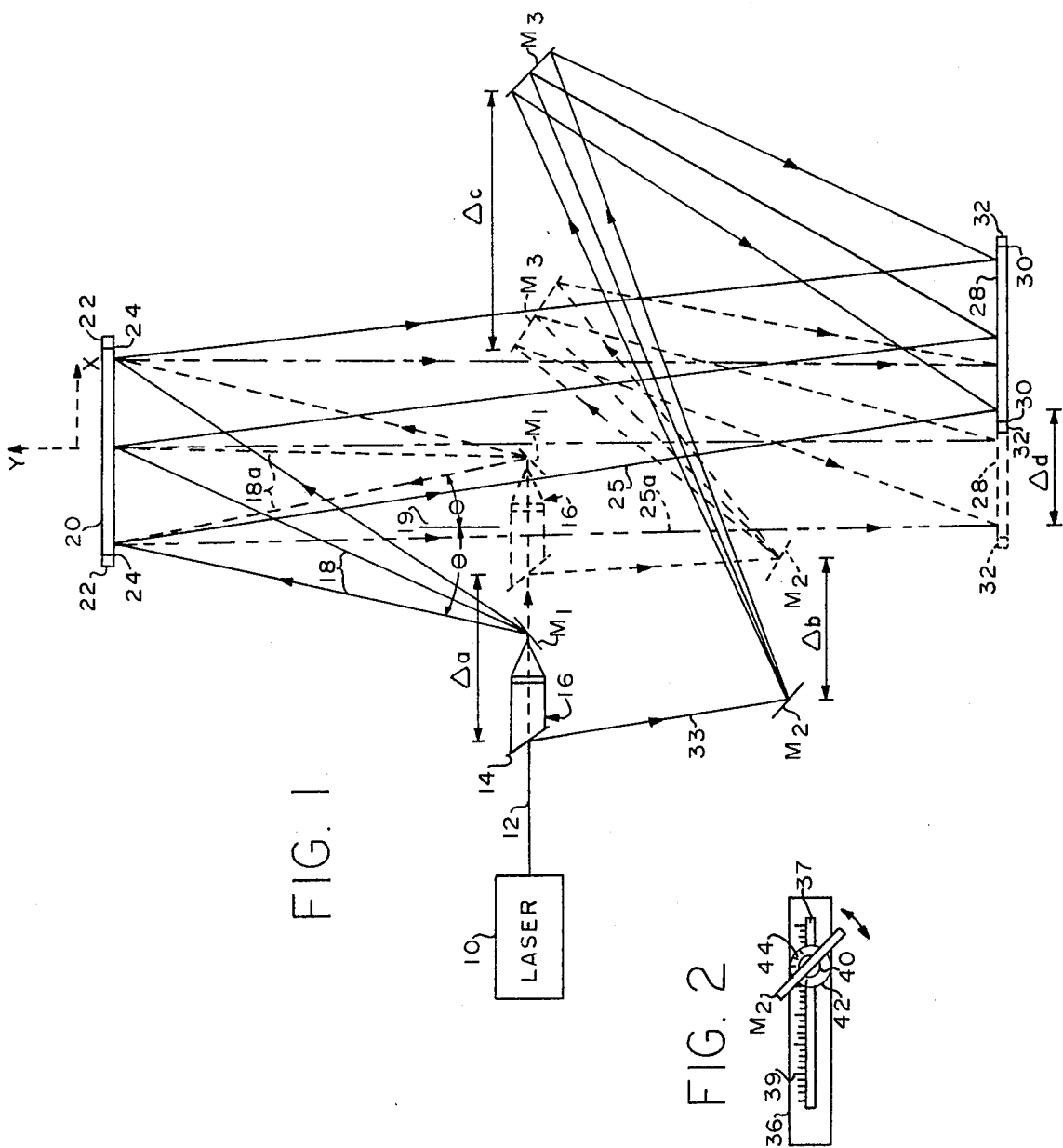

HOLOGRAPHIC SYSTEM FOR NON-DESTRUCTIVE TESTING

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to holography and more particularly to a single system adapted to produce holograms of optimum degrees of detail despite the significant variations in movement of objects being examined.

Perhaps the most promising application of holography is in the field of non-destructive testing. There are presently three basic types of non-destructive testing using holography, namely, the real time analysis method, the double exposure method, and the time averaging method. In real time holography, a single exposure of photographic plate is made of an object in equilibrium at a reference point in time or condition, or both. After development of the plate, it is placed back in the original recording position and the holographic system again operated. This time, typically, the test object is subjected to a measurable stress and viewed through the developed photographic plate. Any deformation of the object changes the phase of the light reflected from it and destructive interference takes place for points whose phase is changed by odd multiple of 180°, i.e., path length change equal to one-half wave length of the laser light providing the illumination for the system. This destructive interference is evidenced by dark bands or fringes representative of half wave length distances which appear across a virtual image on the photographic plate.

The frequency and the position of these fringes is analyzed to determine the magnitude and direction of deformations. As long as the object is not displaced more than a few wave lengths of light between the initial recording and the instance of viewing, any number of different deformations may be analyzed and photographically recorded. A difficulty is that microscopic movement of any system component destroys real time fringes.

With double exposure holography, instead of merely viewing the object after deformation through the first developed exposure, a second exposure of the photographic plate is made after the object has been stressed. In this manner, two actual holograms are recorded on the plate and may be viewed by developing the plate, replacing the plate in the holographic system and illuminating the plate by the reference beam of the system. Two virtual images are formed because two exposures are made. Any deformations in the object between exposures causes the phase of the reflected light to differ which results in the same type of interference fringes referred to above.

Time averaging holography is primarily useful in analysis of periodic deformations of an object caused by vibration and, typically, two successive exposures of a holographic plate of an object being vibrated enables two positions of the object to be recorded at or near the peaks of vibration because velocity is less in the region of the peaks. On development of the plate and reconstruction as in the case described above for double exposure holography, there will be provided interference between the wave fronts from the two virtual images causing fringe formation. Analysis of the fringes yields information of the shape and amplitude of the vibrating areas.

In all cases the quantative information is obtained by the analysis of the interference fringes which occur in the vicinity of the reconstructed images of the object under study. The major difference between the three methods of testing lies in the amplitude or velocity of the motion of the test object in that the deformations which occur result in half length changes of the illuminating object beam. Thus, heretofore, the user must at first determine which method would yield the best results and then set about to arrange a particular optical arrangement of components to enable the particular test. If he decides to change to another method, a new arrangement of optical components is typically required.

SUMMARY OF THE INVENTION

It is the object of this invention to provide a single system for non-destructive testing which is capable of carrying out any one of the above described methods and may be readily shifted from employment for one to the other.

It is a further object of this invention to provide a system which may be fabricated into a mobile, non-laboratory, apparatus, capable of enabling users to test objects having amplitude displacements and/or velocities ranging from large ones to extremely small ones making only a few minor adjustments in the system.

In accordance with this invention, both the object beam and reference-beams are angularly adjustable. By varying the angle of illumination of the object, varying degrees of sensitivity of the system are obtained, enabling optimum observation of anticipated deformations of an object. The reference beam is adjustable in order to maintain sufficient illumination of the photographic plate upon which the object beam is directed to obtain a hologram.

BRIEF DESCRIPTION OF THE DRAWINGS

FIG. 1 is a schematic diagram of the holographic system of this invention.

FIG. 2 is a pictoral view of an assembly for providing calibrated adjustments of an optical element of the system.

DESCRIPTION OF THE PREFERRED EMBODIMENT

Referring initially to FIG. 1, laser 10, typically an argon laser, provides either a continuous or pulsed laser light beam 12. This beam is directed onto beam splitter 14, which as shown, is attached to or mounted on, although not necessarily, the same carriage as lens assembly 16. Lens assembly 16 is adapted to receive essentially half of the light provided by beam splitter 14 and projects it via mirror $M_1$ with a beam 18 having a beam width sufficient to cover the area of a test object 20, held by object holder 22 in an aperture 24 formed by the holder. The light reflected from object 20, object beam 25, possesses information as to the observed surface of object 20 and it passes on to and is recorded on plate 28, positioned in aperture 30 by plate holder 32.

The reference beam, beam 33, with which object beam 25 is compared and with which it interferes to produce a hologram on photographic plate 28, is derived from the reflected portion of light applied to beam splitter 14. This reference beam is first directed onto mirror $M_2$, then reflected onto mirror $M_3$ and finally reflected onto photographic plate 28. While not shown, where necessary, appropriate lens would be included in the path of reference beam 33 in order to enable this beam to fully cover photographic plate 28.

It will be noted that the surface to be viewed of a test object is held by object holder 22 substantially in a plane which is parallel to the plane in which photographic plate 28 is held by plate holder 32. Further, it is to be noted that mirror $M_1$, which will be termed a field mirror inasmuch as it is moved in and out of the projection field between object 20 and photographic plate 28, is positioned to receive light from beam splitter 14 along a line of direction also parallel to the viewed surface of object 20 and exposed surface of photographic plate 28. Still further, it is to be noted that the position of this line of the beam directed on mirror $M_1$ is in a direction which would, if not reflected, intersect the reflected field between object 20 and photographic plate 28. This geometry of the optics particularly enables coordinate optical path changes of the system of the invention.

As indicated by the directional-dimensional lines $\Delta a$, $\Delta b$, $\Delta c$ and $\Delta d$, lens assembly 16 and mirrors $M_2$, $M_3$ and plate holder 32 are movable along these lines. In addition, mirrors $M_1$, $M_2$ and $M_3$ are adjustably rotatable, as indicated by the arrows adjacent these elements. As shown by the representation of lens assembly 16, mirrors $M_1 - M_3$ and photographic plate 28, the movement of these elements to a shifted position results in a shifted set of optical beams. Thus, beam 18 may be shifted to a position 18a wherein object 20 is illuminated by a beam angle of essentially zero with respect to a line perpendicular to its surface and, accordingly, the newly positioned object beam 25a is received on photographic plate 28 at such angle with respect to the line perpendicular to its surface. Plate holder 32 has, of course, been moved to a viewing position to accommodate this angle of view and mirrors $M_2$ and $M_3$ repositioned to provide a correctly positioned reference beam on photographic plate 28 as repositioned.

The problem considered by the applicant and its solution as provided by this invention will be briefly reviewed in order for one to appreciate the reason for the arrangement of components illustrated in the drawings. Typically, for example, a non-destructive test of an object would proceed as follows: First, the object would be positioned, as shown, in object holder 22 and with the optical elements arranged in some position within their range of adjustment to provide an exposure of a hologram on photographic plate 28. Thereafter, the object would be placed under some stress, by means not shown, typically some stress which the object might be expected to meet when used for its intended purpose. By knowing something of the direction and magnitude of the anticipated surface deformation of the object, the person performing the test would be enabled by the invention to position lens assembly 16, and thus mirror $M_1$, to a position which will enable a desired degree of sensitivity by the system to the end that the combination of holograms, the one taken before stress and the one taken after applied stress, will produce interference fringes of suitable peripheral length and spacing to enable accurate analysis of the deformations produced by the test.

Where relatively large deformations are anticipated between holograms, a less sensitive test is desirable than if the tests are to involve very small deformations. The least sensitive position of the system is with lens assembly 16 in the solid line position as originally described. Thus, for ecample, a discrete deformation of the surface of object 20, regardless of direction (as indicated by X and Y directional arrows), will result in a smaller change in object beam path length as angle $\theta$, the angle between beam 18 or 18A, and a line 19 perpendicular to the surface of object 20, is increased. Conversely, a greater change in path length will result for the same deformation as this angle is decreased. This effect is significant in two respects. One, in order to obtain a single useable hologram, the object cannot move greater than an amount which would produce an object beam path change during the photographic exposure for that hologram of more than one-half wave length of the light employed. Thus, for a given exposure time and anticipated relative movement of a test object with respect to the object beam, angle $\theta$ must be adjusted so that the path length change of the beam for a given point on the object will not change more than a half wave length distance.

Second, and perhaps more significant, between successive exposures, the path length change determines the degree of magnification or sensitivity of the fringe image pattern obtained by combining successive exposures which produces the interference fringes used for measurement. The number and spacing of these fringes recorded or otherwise observed may be selected in accordance with the degree of detail desired or required in a given test, a greater degree of sensitivity being obtained with smaller angles of $\theta$.

Thus, by adjustment of angle $\theta$ by adjustment of lens assembly 16 and mirror $M_1$, the system of this invention may be employed to accommodate either or both of the path length considerations; that is, to insure that during a single exposure a useable hologram is obtained and to enable successive holograms to provide fringe patterns of appropriate detail.

When an adjustment is made to angle $\theta$ by movement of lens assembly 16 and, if necessary, rotation of mirror $M_1$, to obtain proper illumination of object 20, coordinate changes are made in the position and orientation of mirror $M_2$, mirror $M_3$ and photographic plate holder 32 to the end that the path length between the object and reference beams are made substantially identical, within the coherence range of the light source, and to properly and fully illuminate the photographic plate 28 with the reference beam.

FIG. 2 illustrates means for mounting optical elements to provide the adjustments required. A frame or bracket 36 is supported and appropriately positioned by means not shown. It includes a slot 37 with calibration markers 39 spaced along the side of the slot in which mirror $M_2$, or lens assembly 16, mirror $M_3$ or plate holder 32 would be rotably supported by means of a cam 40. In the case of one of the mirrors, a rotary scale 42 having index markers 44 would be positioned beside one of the mirrors and the mirror would be angularly adjusted by means, not shown on cam 40, to set a mirror to a desired angular position. Mirror $M_1$ would similarly be mounted, by means not shown, to enable it to be angularly adjusted as illustrated by the adjacent arrow in FIG. 1. While the mounting means illustrated in FIG. 2 provides for a combination of linear and rotatable adjustment, it is to be appreciated that an optical element may be moved in an arc by suitable means to achieve an appropriate position in the system. It is to be further appreciated that some variations in the optics employed may be made without changing the basic teaching of the illustrated system. For example, the reference beam path may be varied by providing an additional mirror and this will enable mirror $M_3$ to be removed from the optical field between the object and photographic plate.

In accordance with one additional feature of this invention, mirror $M_1$ is optically positioned close to lens assembly 16 and thus at a point where the beam has not appreciably expanded, thus it may be kept small to provide little loss of light, even though it and lens assembly 16, also of small dimension, penetrates the field between the object and photographic plate.

The significance of the present invention is that it provides a practical holographic non-destructive testing apparatus which may be employed where needed. Instead of what has been a purely laboratory procedure, holographic materials analysis may now be carried out in the factory or shop and thus its valuable usage greatly expanded.

What is claimed is:

1. A holographic system comprising:

a source of monochromatic light;

beam splitting means for dividing this light into an object beam and a reference beam;

first illuminating means, comprising a first mirror, for directing said object beam onto an object;

holding means for holding and positioning photosensitive material to receive light which has impinged on said object;

second illuminating means for directing said reference beam onto said photosensitive material, and comprising second and third spaced mirrors providing an optical path between said means for dividing said light and said photosensitive material;

first positioning means for adjustably positioning said first illuminating means for selectively varying the angle of illumination of said object, and comprising means for moving said first mirror along a line parallel to a reference plane corresponding to the plane of said holder and photosensitive material held therein and for selectively rotating said first mirror about an axis perpendicular to said line; and second positioning means for positioning said second illuminating means for selectively varying the angle of said reference beam on said photosensitive material, and comprising means for selectively moving said second mirror along a line parallel with said reference plane, means for selectively rotating said second mirror about an axis perpendicular to said reference plane, and means for moving said third mirror along a line parallel with said reference plane and for selectively rotating said third mirror about an axis perpendicular to said reference plane;

whereby the angles at which said beams reach said object and said photosensitive material may be selectively varied and thus the sensitivity of said system to deformation of a test object be varied and said angles may be made identical and thereby obtain interference fringes with a selected degree of detail on said photosensitive material.

2. A holographic system as set forth in claim 1 wherein at least a portion of the path movement of said first mirror positions said first mirror between said object and said photosensitive material holder and wherein a line between said object and said material held by said holder is substantially perpendicular to said reference plane.

3. A holographic system as set forth in claim 2 wherein said source of light provides a beam to said beam splitting means which is parallel to said reference plane.

4. A holographic system as set forth in claim 3 wherein at least one of said positioning means includes a mounting plate having an elongated slot parallel to said reference plane and further includes means supporting a said mirror in a said slot whereby linear adjustment of a said mirror is effected by sliding said mounting means in and along said slot.

* * * * *